United States Patent [19]

Takato et al.

[11] Patent Number: 5,128,992
[45] Date of Patent: Jul. 7, 1992

[54] HYBRID CIRCUIT

[75] Inventors: Kenji Takato, Kawasaki; Toshiro Tojo, Machida; Yuzo Yamamoto, Kawasaki, all of Japan

[73] Assignee: Fujitsu Limited, Kanagawa, Japan

[21] Appl. No.: 565,050

[22] Filed: Aug. 9, 1990

[30] Foreign Application Priority Data

Aug. 11, 1989 [JP] Japan .................. 1-207006

[51] Int. Cl.[5] .................................. H04M 1/00
[52] U.S. Cl. .......................... 379/402; 379/345; 379/398
[58] Field of Search ............ 379/398, 399, 402, 405, 379/413, 345

[56] References Cited

U.S. PATENT DOCUMENTS

| 4,004,109 | 1/1977  | Boxall .          |         |
|-----------|---------|-------------------|---------|
| 4,203,012 | 5/1980  | Boxall .          |         |
| 4,300,023 | 11/1981 | Kelley et al.     | 379/405 |
| 4,358,645 | 11/1982 | Brown             | 379/405 |
| 4,406,929 | 9/1983  | Pace et al.       | 379/402 |
| 4,431,874 | 2/1984  | Zobel et al.      | 379/345 |
| 4,600,811 | 7/1986  | Hayashi et al.    | 379/405 |
| 4,827,505 | 5/1989  | Takato et al.     | 379/399 |
| 4,852,162 | 7/1989  | Taya et al.       | 379/413 |

FOREIGN PATENT DOCUMENTS

| 57-501155 | 2/1882 | Japan .          |
|-----------|--------|------------------|
| 59-161192 | 9/1984 | Japan .          |
| 59-161193 | 9/1984 | Japan .          |
| 2001508   | 1/1979 | United Kingdom . |

OTHER PUBLICATIONS

IEEE Journal of Solid-State Circuits, vol. SC-16, No. 4, Aug. 1981, pp. 270-278; W. D. Pace: "A monolithic telephone subscriber loop interface circuit".

Primary Examiner—James L. Dwyer
Assistant Examiner—Jhancy Augustus
Attorney, Agent, or Firm—Helfgott & Karas

[57]  ABSTRACT

A hybrid circuit which converts receiving side four-wire signals from a switching network into two-wire signals, supplies the same through line B and line A to a telephone terminal equipment, and converts two-wire signals supplied from the telephone terminal equipment through the line A and the line B to the switching network into transmitting side four-wire signals, including a pair of battery feeding and terminating resistors connected between power sources (GND and $V_{BB}$) and the line B and line A and a receiving side mirror circuit and transmitting side mirror circuit both connected between the lines B and A.

8 Claims, 6 Drawing Sheets

HYBRID CIRCUIT

BACKGROUND OF THE INVENTION

1. Field of the Invention

The present invention relates to a hybrid circuit, more particularly to a hybrid circuit which is connected through a pair of lines B and A, i.e., subscriber lines, to a telephone terminal equipment, converts a receiving side four-wire signal to the telephone terminal equipment into a two-wire signal on the lines B and A and transmits the same, and converts a two-wire signal transmitted from the telephone terminal equipment to a transmitting side four-wire signal and transmits the same.

2. Description of the Related Art

A conventional, general, typical hybrid circuit consists of a transformer, as mentioned later in detail. However, if a transformer is used, there are limits to how small the hybrid circuit can be made and further there is the disadvantage of susceptibility to temperature fluctuations etc. Further, there is the disadvantage of greater deterioration of the characteristics at low frequencies. The biggest disadvantage of all is that it is difficult to make the transformer with an LSI.

Therefore, in recent years, attempts have been made to realize a hybrid circuit suitable for an LSI by making the transformer functions in the hybrid circuit by electronic components. A typical example of this is U.S. Pat. No. 4,004,109 to Boxall. The hybrid circuit patented by Boxall, as will be explained with reference to the figures later, succeeds in electronically realizing the transformer function by connecting several mirror circuits to the lines A and B.

However, if use is made of the hybrid circuit of Boxall, a phenomenon of non-balance to the ground occurs in the in-phase signal (in general, the noise signal from the outside) superposed on the lines B and A due to the fact that it is impossible, from the current IC manufacturing technology, to achieve ideal characteristics for all the mirror circuits, i.e., to achieve mirror circuits all having the exact same electrical characteristics. In-phase signals affected by this non-balance to ground appear as differential signals on the lines B and A. These in-phase signals changing to differential signals become noise with respect to the real differential signals (two-wire signals constituting speech and other communication signals) transmitted on the lines B and A. This noise causes deterioration of the quality of the signal (speech) and must be suppressed as much as possible.

Note that another electronic hybrid circuit of a similar construction as Boxall is disclosed in FIG. 4 of U.S. Pat. No. 4,827,505.

SUMMARY OF THE INVENTION

Therefore, the object of the present invention is to provide a hybrid circuit suited for LSI by electronically realizing the transformer function in the hybrid circuit, in particular a hybrid circuit constituted so that the in-phase signals do not change into virtual differential signals due to the above-mentioned non-balance to ground, thereby to improve the signal (speech) quality.

To attain the above object, the hybrid circuit of the present invention is constituted by a plurality of mirror circuits connected between the line B and the line A and pairs of battery feeding and terminating resistors connected between the line B and one of the power sources (ground) and line A and another power source ($V_{BB}$).

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
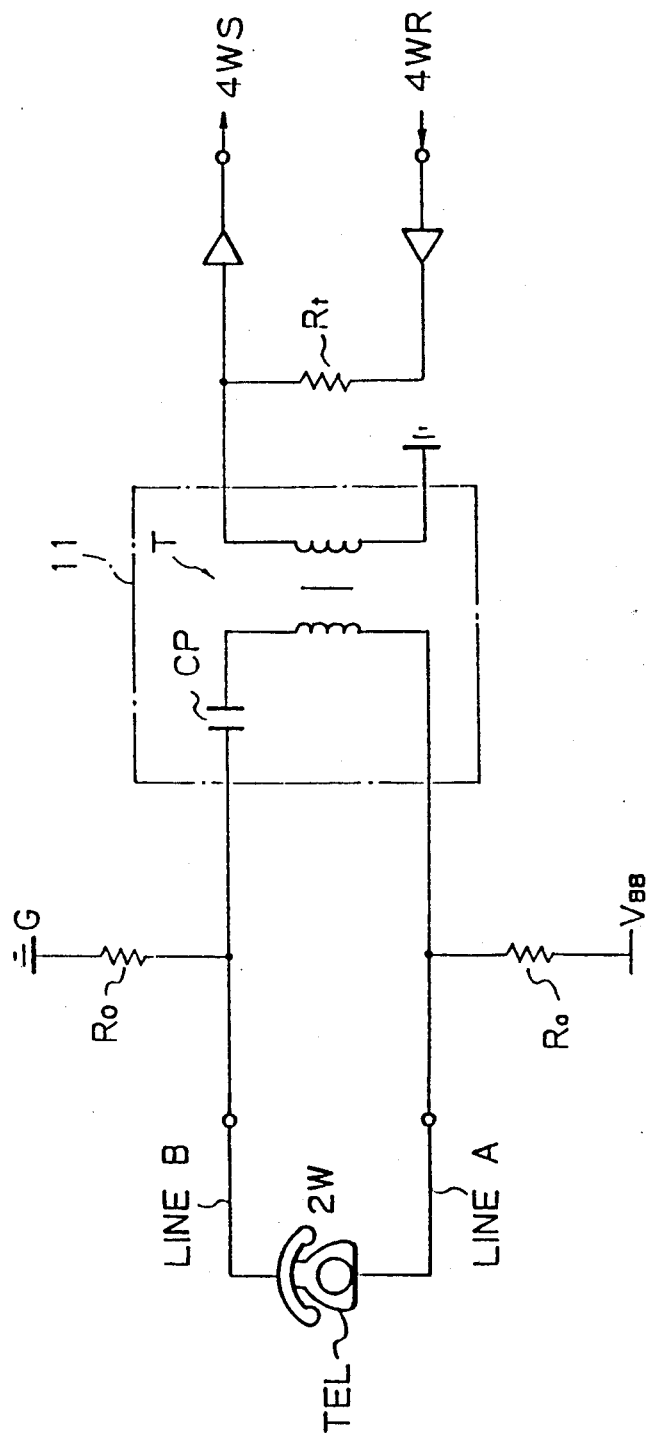
FIG. 1 is a view of a conventional, general, typical hybrid circuit using a transformer.

FIG. 1 is a view of a conventional, general, typical hybrid circuit using a transformer. In the figure, 11 is a hybrid circuit, which hybrid circuit 11 is connected at one end of a pair of lines B and A connected at the other end to a telephone terminal equipment TEL of a subscriber line. A receiving side four-wire signal (speech signal) 4WR supplied from a switching network (not shown) to the telephone terminal equipment passes through a terminating resistor $R_t$ (for example 600Ω) and the hybrid circuit 11 to be converted to a two-wire signal 2W on the line B and the line A and is transmitted to the telephone terminal equipment. Conversely, the two-wire signal 2W transmitted from the telephone terminal equipment passes through the hybrid circuit 11, is converted to a transmitting side four-wire signal (speech signal) 4WS, and is output to the above switching network.

The hybrid circuit 11 primarily performs the function of a transformer and has built as a transformer T in the figure. This transformer T is provided with a DC cut capacitor CP of about 2 μF so that DC current does not flow, i.e., so as to pass only AC signals (speech signals). This DC current is primarily the battery feed current and is supplied from the power sources through battery feeding resistors $R_0$. The power sources are shown by the ground G and $V_{BB}$ where $V_{BB}$ is for example, −48 V. The resistors $R_0$ usually provide extremely high impedance for AC voltage, while the terminating resistor $R_t$ is set to, for example, 600Ω.

As mentioned, in FIG. 1, provision is made of a transformer T having a turn ratio of 1:1 so as to transmit speech signals in two-ways between the telephone terminal equipment of the subscriber and the above switching network.

By using the transformer T, various functions are satisfied. Generally speaking, the hybrid functions are satisfied, e.g.:

(1) Two-way signal transmission function, (2) Conversion function between balanced signal (two-wire signal 2W) and non-balanced signal (four-wire signal 4WS, 4WR), and (3) DC isolation function, i.e., function of being not sensitive to DC potential differences between the primary side and secondary side and of being not sensitive to in-phase input (for example, commercial frequency noise on line B and line A).

On the other hand, there are the several disadvantages as mentioned above. In particular, the existence of the transformer T makes it impossible to construct the hybrid circuit 11 by an LSI, a critically defect.

Therefore, recently, proposal was made of a hybrid circuit suited for an LSI by the already mentioned U.S. Pat. No. 4,004,109 (Boxall).

Figure 2:
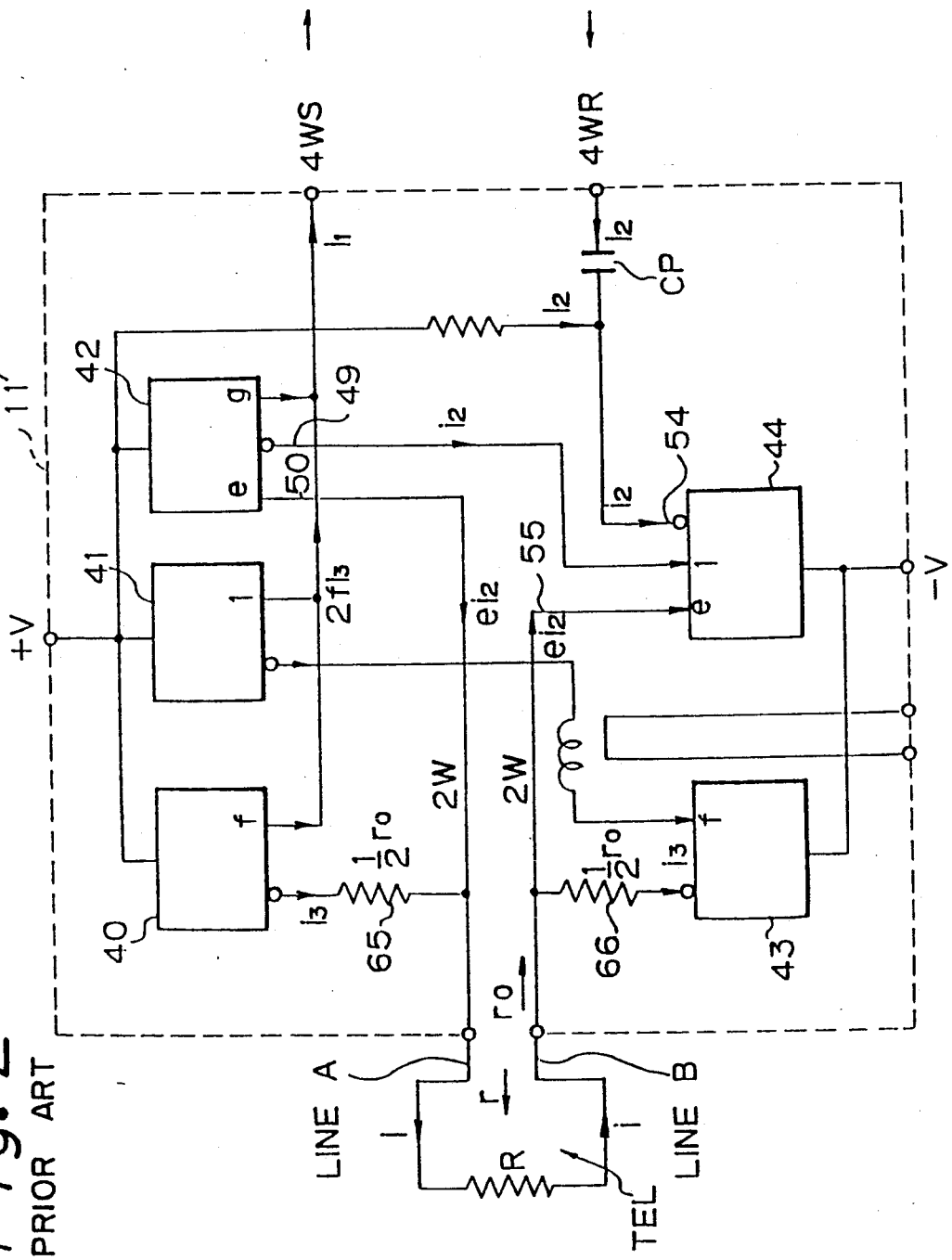
FIG. 2 is a view of a hybrid circuit proposed in U.S. Pat. No. 4,004,109.

FIG. 2 is a view of the hybrid circuit proposed by U.S. Pat. No. 4,004,109. In the figure, a telephone terminal equipment TEL is connected to one end of a pair of lines A and B, while a hybrid circuit 11' is connected at the other end. The input of the hybrid circuit 11' is the receiving side four-wire signal 4WR, while the output is the transmitting side four-wire signal 4WS. Further, the power sources +V and −V driving the circuit 11' correspond to the ground G and the power source $V_{BB}$ of FIG. 1. The transformerless type hybrid circuit 11' converts two-wire signals 2W into transmitting side four-wire signals 4WS by the line A side mirror circuits 40 and 41 and the line B side mirror circuit 43 and converts receiving side four-wire signals 4WR to two-wire signals 2W by the line A side mirror circuit 42 and the line B side mirror circuit 44. Further, the battery feeding and terminating resistors 65 and 66 are connected between the line A and the line B and the mirror circuits 40 and 43, respectively.

The potentials of the differential signals (speech signals) on the lines A and B are converted to current values by the resistors 65 and 66, which current values are output from the mirror circuits 40 and 43, differentially combined by the mirror circuit 41, and become the transmitting side four-wire signal 4WS.

On the other hand, the receiving side four-wire signal 4WR is input to the terminal 54 of the mirror circuit 44, passes through the mirror circuits 42 and 44 connected by the line 49, is supplied to the lines A and B by the lines 50 and 55, and is transmitted to the telephone terminal equipment as a two-wire signal 2W corresponding to the receiving side four-wire signal 4WR.

The previously mentioned problems occur due to the hybrid circuit 11' of the construction shown in FIG. 2, however. That is, the non-balance to ground results in some of the in-phase signals on the lines A and B turning into differential signals which in turn become noise and end up deteriorating the quality of the speech. This non-balance to ground occurs due to the inability to manufacture all the mirror circuits 40, 41, 42, 43, and 44 to have the exact same electrical characteristics. In particular, the line A side mirror circuits 40, 41, and 42 are made of PNP transistors, while the line B side mirror circuits 43 and 44 are NPN transistors, so it is almost completely impossible to make the electrical characteristics of the line A side mirror circuits and the electrical characteristics of the line B side mirror circuits match completely.

Therefore, in view of the above problems, the present invention proposes the hybrid circuit explained below.

Figure 3:
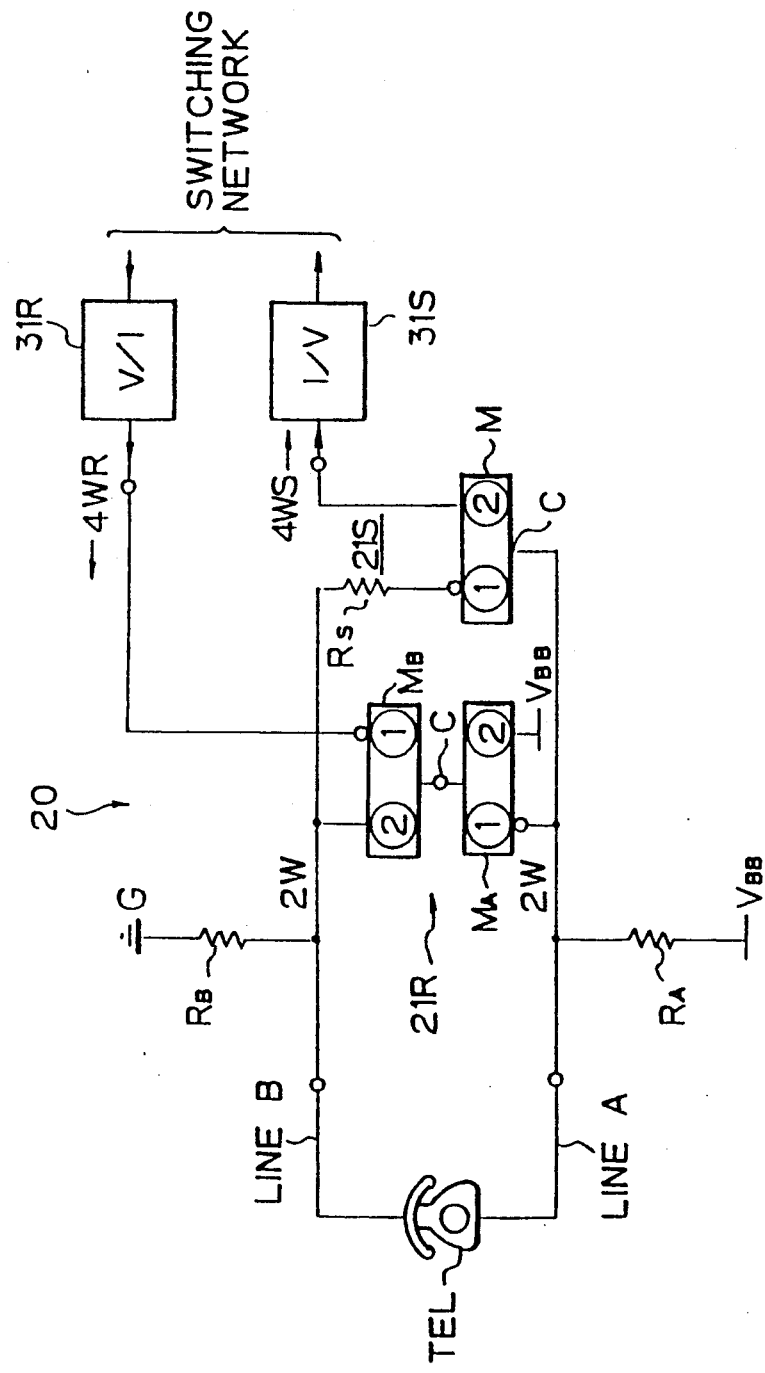
FIG. 3 is a view of the principle and constitution of the present invention.

FIG. 3 is a view of the principle and constitution of the present invention. In the figure, the hybrid circuit 20 of the present invention is basically constituted by a pair of battery feeding and terminating resistors $R_B$ and $R_A$, a receiving side mirror circuit 21R, and a transmitting side mirror circuit 21S.

The pair of battery feeding and terminating resistors $R_B$ and $R_A$ are a pair of resistors for battery feed and termination of the telephone terminal equipment TEL and are connected between the lines B and A and the power sources (G, $V_{BB}$).

The receiving side mirror circuit 21R includes a line B side mirror circuit $M_B$ which receives at a first terminal ① a receiving side input current corresponding to the receiving side four-wire signal 4WR, supplies receiving side output current equal to the receiving side input current to the line B, and is provided with a common terminal C which outputs the sum of the receiving side input current and receiving side output current and a line A side mirror circuit $M_A$ which shares the common terminal C, supplies the receiving side input current to a second terminal ②, and supplies a receiving side output current equal to the receiving side input current from the first terminal ① to the line A.

The transmitting side mirror circuit 21S includes a transmission resistor $R_S$ and an A-B line crossing mirror circuit M. The transmission resistor $R_S$ is a resistor for converting the voltage between the lines B and A into current and produces the transmitting side current of the two-wire signal 2W transmitted from the telephone terminal equipment TEL.

The A-B line crossing mirror circuit M receives the transmitting side current at the first terminal ①, is connected at the common terminal C to the line B, and produces a transmitting side four-wire signal 4WS equal to the transmitting side current at the second terminal ②.

Preferably, the above hybrid circuit 20 is provided with a voltage/current converter (V/I) 31R connected to the first terminal ① of the line B side mirror circuit $M_B$ and a current/voltage converter (I/V) 31S connected to the second terminal ② of the transmitting side mirror circuit 21S and converts the receiving side four-wire signals 4WR and the transmitting side four-wire signals 4WS from the transmitting side mirror circuit 21S from current to voltage.

The clear difference between the hybrid circuit 20 of the present invention shown in FIG. 3 and the prior art hybrid circuit 11' of FIG. 2 is that, in FIG. 3, the receiving side mirror circuit 21R is not directly connected to the power sources, but is connected between the line B and the line A. Further, the transmitting side mirror circuit 21S similarly is not directly connected to the power sources, but is connected between the line B and the line A.

Therefore, the only elements connected between the power sources (G, $V_{BB}$) and the lines B and A are the battery feeding and terminating resistors $R_B$ and $R_A$. Since the resistors Ra and Rb are pure resistors, the problem of non-balance of the input impedance characteristics, which arose in the mirror circuits 40 and 43 in the Boxall patent, does not arise when the resistances of these resistors Ra and Rb are the same to each other. Therefore, in the present invention there is no occurrence of non-balance to ground in the lines B and A.

On the other hand, the receiving side mirror circuit 21R is also inserted between the line B and the line A and merely feeds current into the same, so does not become a factor causing non-balance to ground.

The same applies to the transmitting side mirror circuit 21S in FIG. 3. The circuit 21S is inserted between the lines B and A and merely draws out current from the same, so does not cause non-balance to ground.

As opposed to this, in the prior art hybrid circuit 11' (FIG. 2), the line A side mirror circuits (40, 41, and 42) and line B side mirror circuits (43 and 44), for which the same characteristics are difficult to obtain, are directly connected at one ends thereof to the power sources (V+ and V−) and further are connected at the other ends to the lines A and B, respectively. With such a construction, a slight mismatch of the characteristics between the line B side mirror circuits and the line A side mirror circuits will cause non-balance to ground and easy occurrence of noise.

Looking at the pair of resistors $R_B$ and $R_A$ in FIG. 3, these serve not only as battery feeding resistors, but also as terminating resistors (equivalent to $R_t$ in FIG. 1) and for example are set so that $R_B=R_A=300\Omega$. On the other hand, the transmission resistor $R_s$ is set to, for example, a high 20 k$\Omega$ so that substantially all the voltage is applied between the lines B and A. Further, the resistance in the mirror circuit 21R (mentioned later) is set to 2 k$\Omega$. By doing this, the termination impedance viewed from the telephone terminal equipment TEL becomes a parallel resistance of 600 ($=300+300$) $\Omega$ and 20 k$\Omega$ and 2 k$\Omega$, and so becomes about less than 600 $\Omega(\approx R_t)$.

A look at the mirror circuit M in the transmitting side mirror circuit 21S shows that at the first terminal ①, the transmitting side current ($=V_{AB}/R_s$) flows. $V_{AB}$ is the voltage between the line B and line A (two-wire signal 2W). In the mirror circuit, usually, the sum of the input current and the output current flows to the common terminal C, so an output current equal to the input current flows to the second terminal ② and a transmitting side four-wire signal (4WS) is produced.

A look at the receiving side mirror circuit 21R shows that use is made of the two mirror circuits $M_B$ and $M_A$ sharing a common terminal C. Considering these as a single mirror circuit 21R ($=M_B+M_A$), there is an extra one second terminal ② connected to the $V_{BB}$ when compared with the general mirror circuit. This is so as to produce a current equal to the current input at the first terminal ① of the mirror circuit $M_B$ (receiving side input current) at the first terminal ① of the mirror circuit $M_A$. That is, the current flowing in from the common terminal C to the line A side is divided into two.

Figure 4:
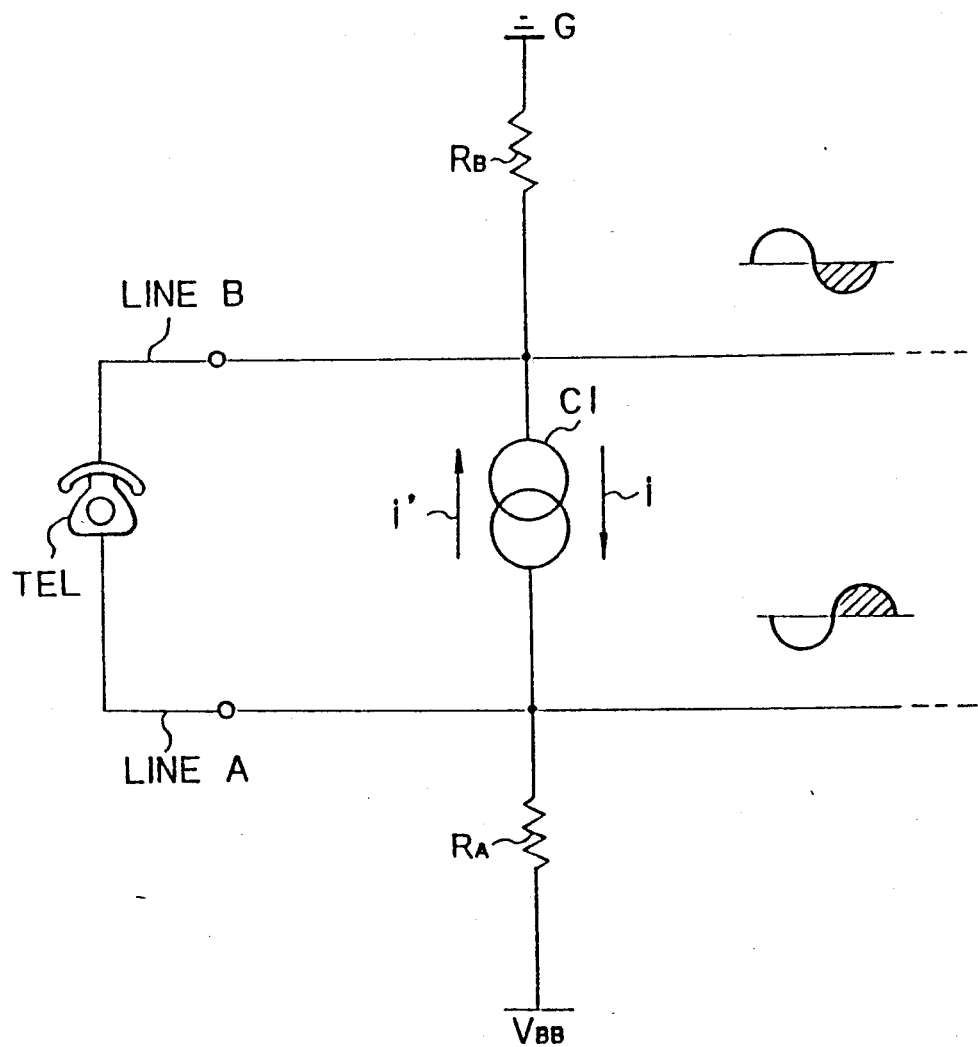
FIG. 4 is an equivalent circuit diagram of the hybrid circuit of FIG. 3.

FIG. 4 is an equivalent circuit diagram of the hybrid circuit of FIG. 3. The mirror circuits 21R and 21S form equivalently an AC constant current source CI, the flowing of this AC current to the resistors $R_B$ and $R_A$ causing the two-wire signal of the illustrated waveform to appear at the lines B and A. When, for example, i in the figure appears, the hatching portion of the signal waveform appears. This becomes an inverse phase signal and forms a two-wire signal 2W. When i' appears, the signal waveform without the hatching is formed.

The voltage/current converter (V/I) 31R and the current/voltage converter (I/V) 31S are introduced in FIG. 3 because in general switching networks are provided with so-called CODEC (pairs of coders and decoders) and perform digital processing of speech signals. That is, the signal processing of the CODEC is performed by the voltage level and to comply with this, a conversion is performed between current and voltage.

Figure 5:
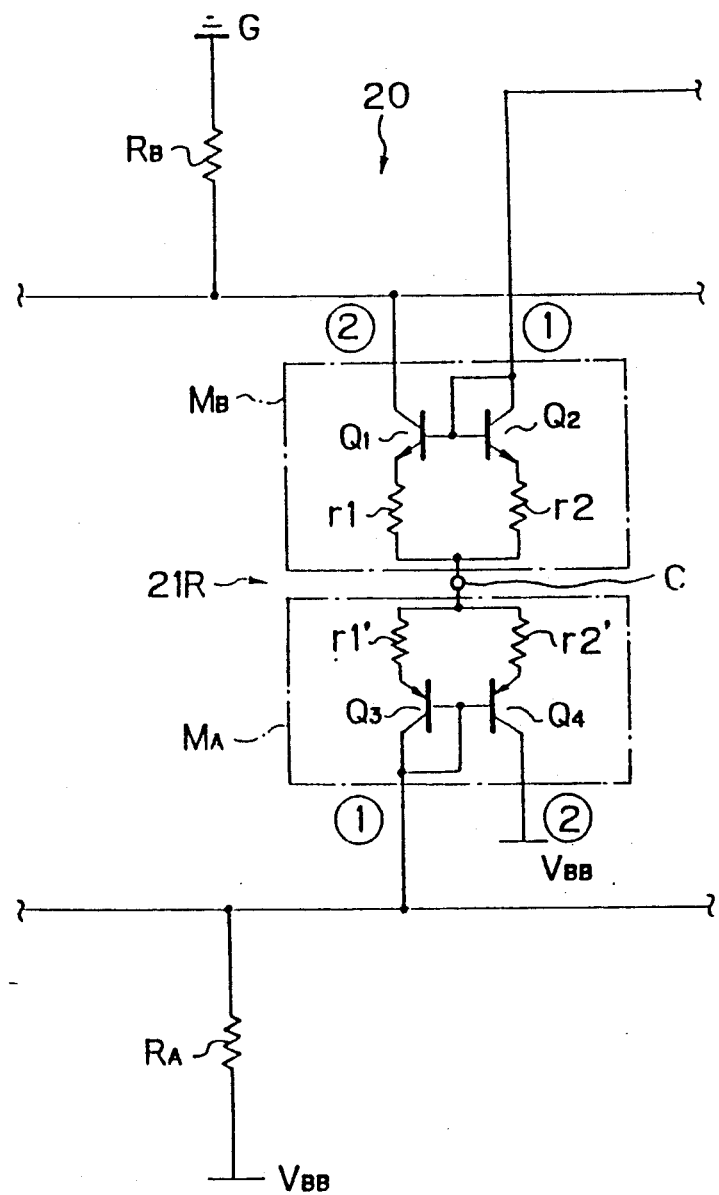
FIG. 5 is a view of a specific example of a receiving side mirror circuit in FIG. 3.

FIG. 5 is a view of a specific example of the receiving side mirror circuit in FIG. 3. In the figure, the line B side mirror circuit $M_B$ includes a first NPN transistor $Q_1$ which has at its emitter a first emitter resistor r1 and has at its collector the above-mentioned second terminal ② and a diode-connected second NPN transistor $Q_2$ which has at its emitter a second emitter resistor r2 and has at its collector the above first terminal ①. Further, the bases of the first and second NPN transistors are connected and one of the ends of the first and second emitter resistors are connected in common to the common terminal C.

The line A side mirror circuit $M_A$ includes a diode-connected third PNP transistor $Q_3$ which has at its emitter a first emitter resistor r1' and has at its collector the above-mentioned first terminal ① and a fourth PNP transistor $Q_4$ which has at its emitter a second emitter resistor r2' and is connected at its collector to the power source $V_{BB}$. Further, the bases of the third and fourth PNP transistors are connected and one of the ends of the first and second emitter resistors are connected in common to the common terminal C.

Figure 6:
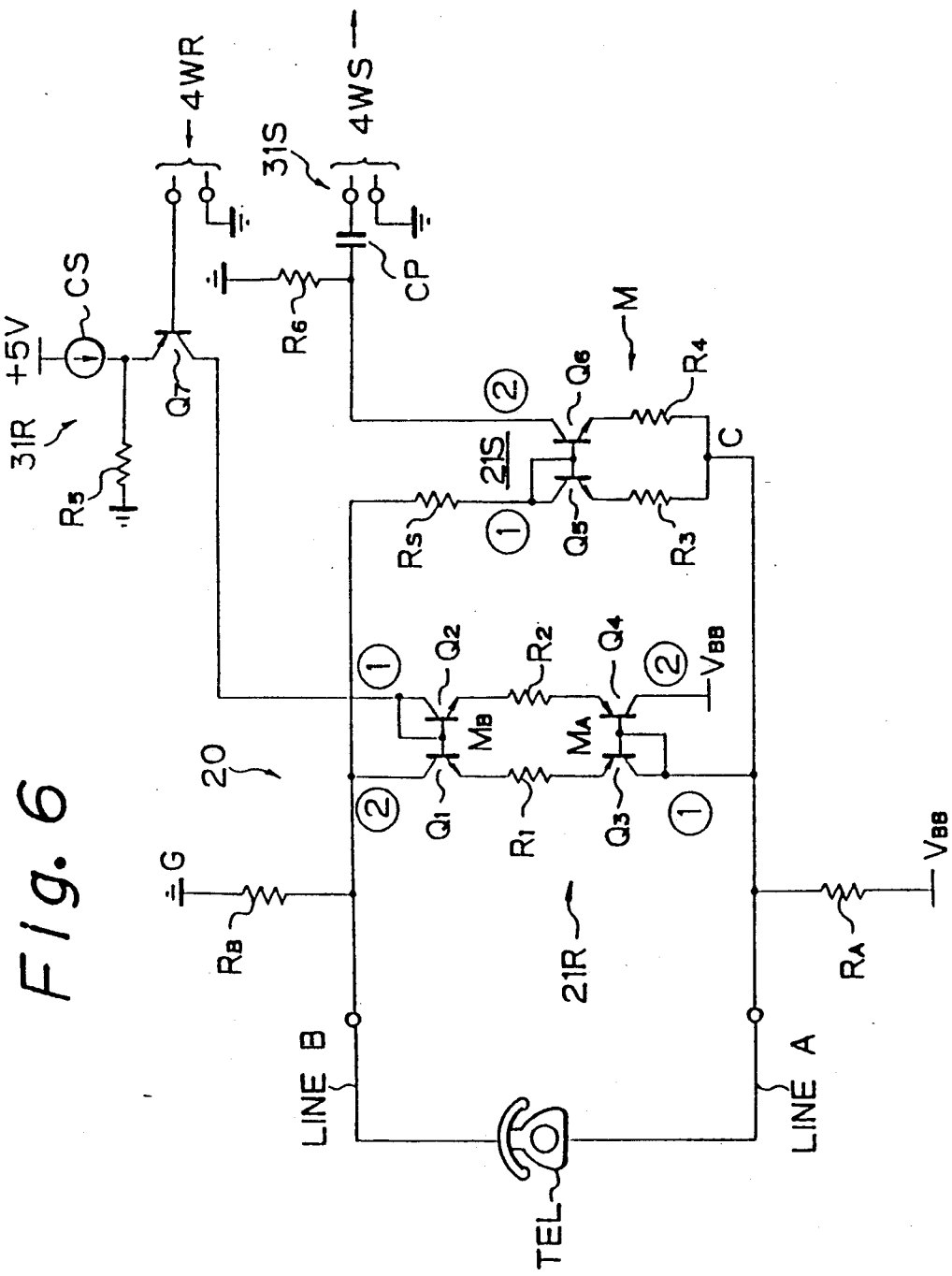
FIG. 6 is a circuit diagram of an embodiment of a hybrid circuit in FIG. 3.

FIG. 6 is a circuit diagram of an embodiment of the hybrid circuit in FIG. 3. In particular, it shows a preferred example of the receiving side mirror circuit 21R, a detailed example of the transmitting side mirror circuit, and a detailed example of the voltage/current converters. First, the line B side mirror circuit $M_B$ which forms the receiving side mirror circuit 21R includes, as mentioned earlier, the pair of NPN transistors $Q_1$ and $Q_2$, while the line A side mirror circuit $M_A$ includes the pair of PNP transistors $Q_3$ and $Q_4$. The resistors in the mirror circuits ($M_B$ and $M_A$) (mentioned later) are consolidated with the resistors R1 and R2 along with the sharing of the common terminal C.

On the other hand, the transmitting side mirror circuit 21S includes the NPN transistors $Q_5$ and $Q_6$ and emitter resistors R3 and R4 connected to the emitters of the same.

In FIG. 6, the common terminal C shown in FIG. 5 is not shown for the transmitting side mirror circuit 21R because of the following reason. The emitter resistors r1, r1', r2, and r2' of FIG. 5 are all of substantially the same resistance values (mirror ratio of 1) and substantially the same current flows to the transistors $Q_1$, $Q_2$, $Q_3$, and $Q_4$. Noting this, if the common terminal C of FIG. 5 is divided in two left and right in the figure, the result is substantially the same. Therefore, it is possible to eliminate the common terminal C and to combine the two resistors r1 and r1' into a single resistor R1 and to combine the two resistors r2 and r2' into a single resistor R2, which is beneficial for an LSI. Note that in general the resistors R1 to R4 in the mirror circuit (FIG. 6) are introduced for the purpose of improving the mirror precision.

The resistance values of the resistors R1, R2, R3, and R4 are, for example, about 2 k$\Omega$. Here, the resistance value of the resistor R3 of 2 k$\Omega$ is extremely small compared with a detecting resistor, i.e., transmission resistor $R_s$ (which is, as mentioned previously, for example, 20 k$\Omega$). As a result, almost all of the voltage $V_{AB}$ between line B and line A is applied to the detecting resistor $R_s$ and the conversion to transmitting side current is performed efficiently. Further, the fact that $R_s$ is a high resistance means that the idling current between G and $V_{BB}$ is reduced, which is economical.

In FIG. 6, the voltage/current converter (V/I) 31R includes a PNP transistor $Q_7$ which receives at its base the voltage of the receiving side four-wire signal 4WR, a resistor R5, and a constant current source CS. The voltage received at the base of the PNP transistor $Q_7$ is applied almost completely to the emitter of the same transistor. To the emitter is connected the constant current source CS for supplying bias current. Here, a current proportional to the base voltage appears at the emitter through the resistor R5 and is supplied to the mirror circuit 21R through the collector of the transistor.

Further, the current/voltage converter (I/V) 31S converts the current from the mirror circuit 21S to voltage and includes a resistor R6 and a DC cut capacitor CP. The voltage Vs of the transmitting side four-wire signal 4WS generated by the resistor R6 is $$VS = (V_{AB}/R_x) \times R6$$

As explained above, according to the electronic transformer of the present invention, the in-phase signals on the lines B and A are kept from changing into differential signals due to non-balance to ground and the noise caused by such in-phase signals can be kept extremely low. This is a remarkable effect over the prior art (FIG. 2).

Further, it is possible to transmit AC signals in the same way as the conventional transformer shown in FIG. 1. Further, in the same way as a conventional transformer, it is possible to achieve non-sensitivity to in-phase signals such as commercial frequency noise. That is, the detecting resistor $R_s$ and the mirror circuit 21S operate only with respect to differential signals (two-wire signals) on the lines B and A and are insensitive to in-phase signals such as external noise. Note that the conversion of the non-balanced signals (4WR and 4WS) to balanced signals (2W) is performed by feeding a current to the lines B and A, so there is a possibility of producing conversion error relative to the balanced signal due to the difference between the collector current of the transistor $Q_1$ and the collector current of the transistor $Q_3$, but this error does not pose any problem with respect to the intended performance.

What is claimed is:

1. A hybrid circuit, provided between a switching equipment and a pair of subscriber lines B and A connected to a telephone terminal equipment for converting a receiving side four wire signal from the switching equipment into a two wire signal to the pair of lines B and A and a two wire signal from the pair of lines B and A into a transmitting side four wire signal to the switching equipment, the circuit comprising:

battery feed means, provided at the pair of lines B and A, respectively, for feeding a D.C. current to the telephone terminal equipment and for terminating a signal on the pair of lines B and A with a predetermined impedance;

a receiving side mirror circuit, connected between the pair of lines B and A, for converting the receiving side four wire signal from the switching equipment into the two wire signal to the pair of lines A and B;

resistor means provided between each of said battery feed means and said lines A and B, respectively, for converting a voltage signal between the pair of liens B and A into a current signal; and a transmitting side mirror circuit, connected between the pair of subscriber lines via the resistor means, for converting the current signal into the transmitting side four wire signal to the switching equipment, wherein said receiving side mirror circuit includes:

a line B side mirror circuit including a first terminal connected to said switching equipment and receiving a receiving side input current corresponding to the receiving side four wire signal (4WR) from said switching equipment, a second terminal connected to the line B and supplying a receiving side output current equal to the receiving side input current to the line B, and a first common terminal which outputs the sum of the receiving side input current and the receiving side output current, and a line A side mirror circuit connected to said first common terminal and which includes a first terminal connected to the line A, and a second terminal connected to a power source ($V_{BB}$) so as to feed one-half of the current of the first common terminal to the line A; and said transmitting side mirror circuit includes:

a transmission resistor connected to the line B and converting a voltage between the line B and line A into current and producing a transmitting side current of the two wire signal (2W) transmitted from the telephone terminal equipment, and an A-B line crossing mirror circuit (M) including a first terminal connected to said transmission resistor and receiving said transmitting side current therefrom, a second terminal connected to the switching equipment, and a second common terminal connected to the line A and producing a transmitting side four wire signal (4WS) equal to the transmitting side current at the second terminal thereof.

2. A hybrid circuit as set forth in claim 1, wherein said A-B line crossing mirror circuit is comprised of a diode-connected first NPN transistor which has a first emitter resistor at its emitter and is connected at its collector to the transmission resistor through said first terminal of the crossing mirror circuit, and a second NPN transistor which has a second emitter resistor at its emitter and has said second terminal of the crossing mirror circuit at its collector;

the bases of the said first and second NPN transistors being connected to each other and one end of the first and second emitter resistors being connected in common to said line A.

3. A hybrid circuit as set forth in claim 1, further comprising:

a voltage/current converter which is connected to the first terminal of the line B side mirror circuit and converts the receiving side four wire signal from current to voltage.

4. A hybrid circuit as set forth in claim 3, wherein said voltage/current converter is comprised of a transistor which receives at its base said receiving side four-wire signal and is connected at its collector to the first terminal of said line B side mirror circuit, a resistor connected between the emitter of said transistor and said power source, and a constant current source supplying bias current to said emitter.

5. A hybrid circuit as set forth in claim 1, further comprising a current/voltage converter which is connected to the second terminal of the transmitting side mirror circuit and converts the transmitting side four wire signal from current to voltage.

6. A hybrid circuit as set forth in claim 5, wherein said current/voltage converter is comprised of a capacitor which transmits, from one end, said transmitting side four wire signal and a resistor which is provided between another end of the capacitor, which is connected to the said transmitting side mirror circuit and said power source.

7. A hybrid circuit as set forth in claim 1, wherein
the line B side mirror circuit includes a first NPN transistor which has at its emitter a first emitter resistor and has at its collector the second terminal of the line B side mirror circuit, and a diode-connected second NPN transistor which has at its emitter a second emitter resistor and has at its collector the first terminal of the line B side mirror circuit, the bases of the first and second NPN transistors being connected to each other and one of ends of the first and second emitter resistors being connected in common to the first common terminal, and
the line A side mirror circuit includes a diode-connected third PNP transistor which has at its emitter a first emitter resistor and has at its collector the first terminal of the line A side mirror circuit, and a fourth PNP transistor which has at its emitter a second emitter resistor and is connected at its collector to the power source, the bases of the third and fourth PNP transistors being connected to each other and one of ends of the first and second emitter resistors being connected in common to the first common terminal.

8. A hybrid circuit as set forth in claim 7, wherein
resistance values of the emitter resistors are substantially the same;
the first emitter resistors of the line B side mirror circuit and the line A side mirror circuit are combined to form a single first emitter resistor; and
the second emitter resistors of the line B side mirror circuit and the line A side mirror circuit are combined to form a single second emitter resistor.

* * * * *